(12) United States Patent
Jackson et al.

(10) Patent No.: US 9,395,991 B2
(45) Date of Patent: Jul. 19, 2016

(54) SPECULATIVE LOAD ISSUE

(71) Applicant: IMAGINATION TECHNOLOGIES, LTD., Kings Langley (GB)

(72) Inventors: Hugh Jackson, St. Albans (GB); Anand Khot, Kings Langley (GB)

(73) Assignee: Imagination Technologies Limited, Kings Langley (GB)

( * ) Notice: Subject to any disclaimer, the term of this patent is extended or adjusted under 35 U.S.C. 154(b) by 114 days.

(21) Appl. No.: 14/169,601

(22) Filed: Jan. 31, 2014

(65) Prior Publication Data

US 2014/0229718 A1    Aug. 14, 2014

(30) Foreign Application Priority Data

Feb. 11, 2013   (GB) .................................. 1302373.4

(51) Int. Cl.
   *G06F 9/38* (2006.01)
   *G06F 9/30* (2006.01)
(52) U.S. Cl.
   CPC ........ *G06F 9/30145* (2013.01); *G06F 9/30043* (2013.01); *G06F 9/3834* (2013.01); *G06F 9/3842* (2013.01)
(58) Field of Classification Search
   CPC .................................................. G06F 9/30043
   USPC ....................................................... 712/225
   See application file for complete search history.

(56) References Cited

U.S. PATENT DOCUMENTS 6,115,777 A *  9/2000  Zahir et al. .................... 710/260
6,970,997 B2 * 11/2005  Shibayama et al. .......... 712/225
2005/0149703 A1 * 7/2005  Hammond et al. ........... 712/225
2005/0172110 A1   8/2005  Hirotsu
2006/0026410 A1   2/2006  Yokoi (Continued)

FOREIGN PATENT DOCUMENTS

CN           1193777 A    9/1998
CN         101460922 A    6/2009
CN         102364431 A    2/2012

OTHER PUBLICATIONS

F. Castro, L. Pinuel, D. Chaver, M. Prieto, M. Huang, and F. Tirado. "DMDC: Delayed Memory Dependence Checking through Age-Based Filtering." In MICRO, 2006. 10 pages.*

(Continued)

*Primary Examiner* — Andrew Caldwell
*Assistant Examiner* — Michael Metzger
(74) *Attorney, Agent, or Firm* — Vorys, Sater, Seymour and Pease LLP; Vincent M DeLuca

(57) ABSTRACT

A method and load and store buffer for issuing a load instruction to a data cache. The method includes determining whether there are any unresolved store instructions in the store buffer that are older than the load instruction. If there is at least one unresolved store instruction in the store buffer older than the load instruction, it is determined whether the oldest unresolved store instruction in the store buffer is within a speculation window for the load instruction. If the oldest unresolved store instruction is within the speculation window for the load instruction, the load instruction is speculatively issued to the data cache. Otherwise, the load instruction is stalled until any unresolved store instructions outside the speculation window are resolved. The speculation window is a short window that defines a number of instructions or store instructions that immediately precede the load instruction.

20 Claims, 6 Drawing Sheets

(56) References Cited

U.S. PATENT DOCUMENTS

2007/0226470 A1    9/2007   Krimer et al.
2010/0325395 A1*  12/2010   Burger et al. .............. 712/216
2011/0276791 A1   11/2011   Chaudhry et al.

OTHER PUBLICATIONS

G. Reinman and B. Calder. "Predictive Techniques for Aggressive Load Speculation." In MICRO 1998. 11 pages.*

A. Yoaz, M. Erez, R. Ronen, and S. Jourdan. "Speculation Technique for Improving Load Related Instruction Scheduling". In Proc. of the 26th International Symposium on Computer Architecture. May 1999. 11 pages.*

Search report in corresponding GB application No. 1321319.4 dated Mar. 27, 2014.

Roth, A., "Store Vulnerability Window (SVW): Re-Execution Filtering for Enhanced Load Optimization," Proceedings of the 32nd International Symposium on Computer Architecture (ISCA'05), IEEE 2005, pp. 458-468.

Combined Search and Examination Report under Sections 17 and 18(3), dated Aug. 21, 2013, as cited in GB Application 1302373.4 (5pgs).

* cited by examiner

SPECULATIVE LOAD ISSUE

BACKGROUND

In an out-of-order processor a load instruction may not be safely issued to a memory address before the memory addresses of all of the store instructions preceding the load instruction have been resolved. This is because if a preceding store instruction writes to the memory address read by the load instruction, then the load instruction should read the data written by the store instruction instead of the data in memory to ensure it has the most recent data. However, stalling load instructions until the memory addresses of all preceding store instructions have been resolved causes unnecessary delays.

In some out-of-order processors this issue has been addressed by speculatively issuing load instructions to the memory before the memory addresses of all preceding store instructions have been resolved. If a preceding store instruction is later determined to write to the same memory address as the load instruction then the load instruction is rewound and the correct data used. However, rewinds are complicated and costly and ideally should be avoided.

In some out-of-order processors the number of rewinds has been reduced by predicting whether a load instruction will conflict with a preceding store instruction (e.g. the store instruction will write to the same memory address as the load instruction) based on whether they have conflicted in the past. For example, the program counter may be used to look into a table to determine if the load and the store instructions have conflicted in the past. If they have conflicted in the past then the load instruction may not be issued until the memory address of the store has been resolved. This technique may be useful where the load and store instructions are in a loop and thus are repeatedly executed.

The embodiments described below are not limited to implementations which solve any or all of the disadvantages of known out-of-order processors.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Described herein are methods and load and store buffers for issuing a load instruction to a data cache. The method includes determining whether there are any unresolved store instructions in the store buffer that are older than the load instruction. If there is at least one unresolved store instruction in the store buffer older than the load instruction, it is determined whether the oldest unresolved store instruction in the store buffer is within a speculation window for the load instruction. If the oldest unresolved store instruction is within the speculation window for the load instruction, the load instruction is speculatively issued to the data cache. Otherwise, the load instruction is stalled until any unresolved store instructions outside the speculation window are resolved. The speculation window is a short window that may define a number of instructions or store instructions that immediately precede the load instruction.

A first aspect provides a method of issuing a load instruction in a program to a data cache, the method comprising: determining at a load and store logic unit whether there are any unresolved store instructions in a store buffer that are older than the load instruction; if there is at least one unresolved store instruction in the store buffer older than the load instruction, determining at the load and store logic unit whether the oldest unresolved store instruction in the store buffer is within a speculation window for the load instruction; and if the oldest unresolved store instruction is within the speculation window for the load instruction, speculatively issuing the load instruction to the data cache.

A second aspect provides a load and store buffer to issue a load instruction in a program to a data cache, the load and store buffer comprising: a store buffer for storing one or more store instructions; and a load and store logic unit in communication with the store buffer, the load and store logic unit configured to: determine whether there are any unresolved store instructions in the store buffer that are older than the load instruction; if there is at least one unresolved store instruction in the store buffer older than the load instruction, determining whether the oldest unresolved store instruction in the store buffer is within a speculation window for the load instruction; and if the oldest unresolved store instruction is within the speculation window for the load instruction, speculatively issuing the load instruction to the data cache.

A third aspect provides an out-of-order processor comprising the load and stuff buffer of the second aspect.

A fourth aspect provides a load and store buffer as substantially described in reference to FIG. 2.

A fifth aspect provides a method of issuing a load instruction to a data cache as substantially described in reference to FIG. 4.

A sixth aspect provides a method of dynamically adjusting the size of a speculation window as substantially described in reference to FIG. 5.

The methods described herein may be performed by a computer configured with software in machine readable form stored on a tangible storage medium e.g. in the form of a computer program comprising computer program code for configuring a computer to perform the constituent portions of described methods. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

This acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
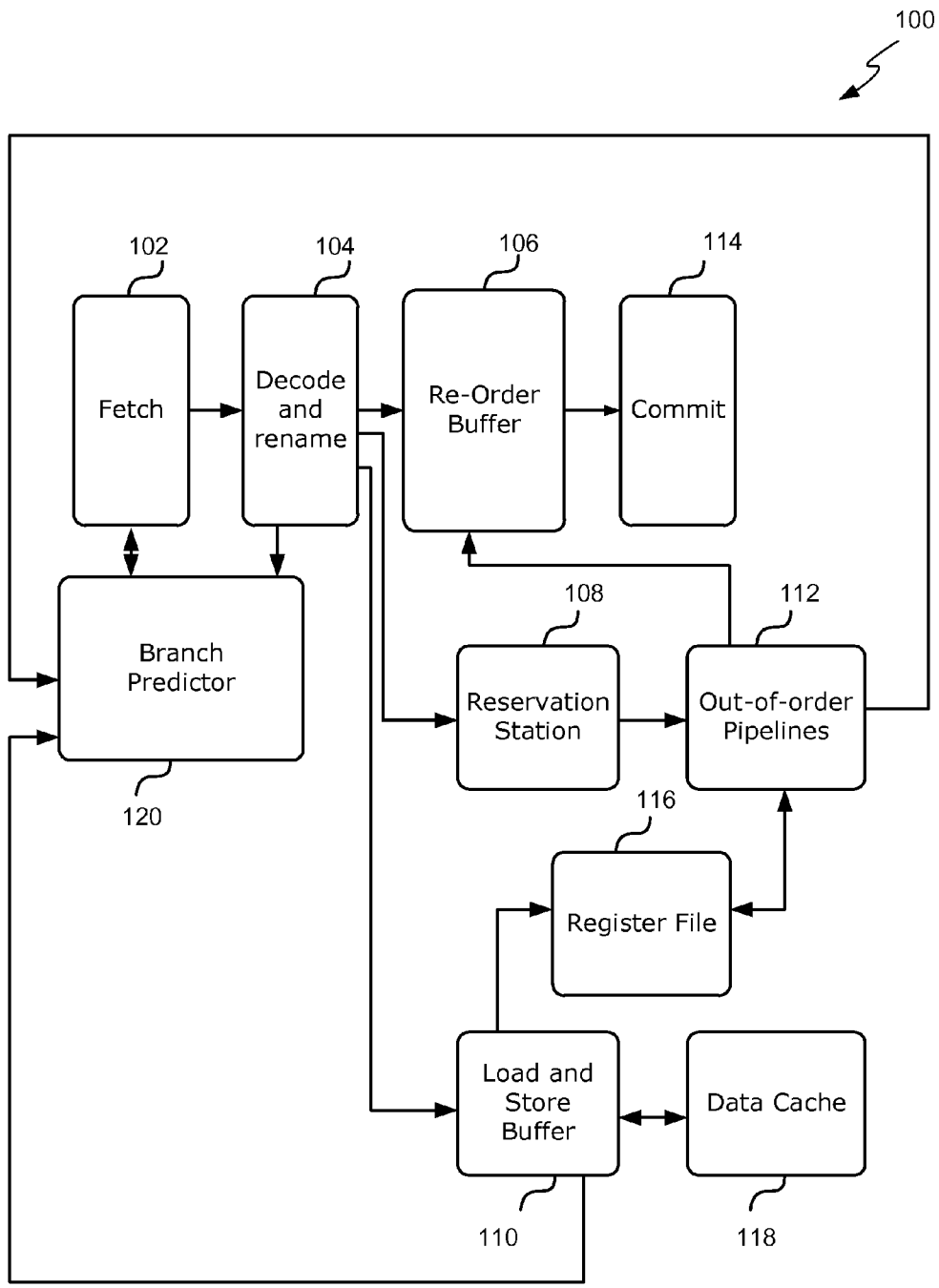
FIG. 1 is a schematic diagram of an example single-threaded out-of-order processor.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

Embodiments described herein relate to methods and load and store buffers for speculatively issuing load instructions in an out-of-order processor that take advantage of the realization that a program is unlikely to comprise code that includes a store to a memory address quickly followed by a load of the same memory address. In particular, in the embodiments described herein load instructions are speculatively issued only if all older unresolved store instructions (e.g. store instructions in which the destination memory address has not been resolved) are within a short window of the load instruction. If there are any older unresolved store instructions outside this window then the load instruction is stalled. In other words, a load instruction may only be speculatively issued if all of the store instructions outside the window have been resolved.

The methods and load and store buffers described herein allow load instructions to be speculatively issued (e.g. issued before the memory addresses of older store instructions have been resolved) and thus reduce the number of unnecessary stalls of load instructions (e.g. stalls of load instructions where the older unresolved load instructions do not write to the same memory address as the load instruction) over methods that do not allow speculative execution of load instructions. Furthermore, they reduce the number of rewinds caused by a mis-speculated load instruction over a purely speculative method (e.g. a method wherein all load instructions are speculatively issued) thus improving the performance of the processor. Specifically, since it is unlikely that a program will write to a memory address and then read from that memory address within a short window, it is unlikely that a load instruction speculatively issued based on unresolved store instructions in this window is mis-speculated and thus would cause a rewind.

In some embodiments, the size of the window is fixed, and in other embodiments the size of the window is dynamically adjusted.

Reference is now made to FIG. 1 which illustrates a single-threaded out-of order processor 100 wherein a load instruction may only be speculatively issued if all older unresolved store instructions are within a short window of the load instruction. The processor 100 comprises a fetch stage 102 configured to fetch instructions from a program (in program order) as indicated by a program counter (PC) and a decode and renaming stage 104 arranged to interpret the instructions and perform register renaming.

After an instruction passes through the decode and renaming stage 104, it is inserted into a reorder buffer 106 (ROB), and dispatched to a reservation station 108 or a load and store buffer 110 for execution based on the type of instruction. For example, load and store instructions may be dispatched to the load and store buffer 110 and all other instructions may be dispatched to the reservation station 108.

The re-order buffer 106 is a buffer that enables the instructions to be executed out-of-order, but committed in-order. The re-order buffer 106 holds the instructions that are inserted into it in program order, but the instructions within the ROB 106 can be executed out of sequence by the out-of-order pipelines 112 and the load and store buffer 110. In some examples, the re-order buffer 106 can be formed as a circular buffer having a head pointing to the oldest instruction in the ROB 106, and a tail pointing to the youngest instruction in the ROB 106. Instructions are output from the re-order buffer 106 in program order. In other words, instructions are output from the head of the ROB 106 when that instruction has been executed by the out-of-order pipelines 112 or the load and store buffer 110, and the head is incremented to the next instruction in the ROB 106. Instructions output from the re-order buffer 106 are provided to a commit stage 114, which commits the results of the instructions to the register/memory.

The reservation station 108 receives instructions from the decode and renaming stage 104 and stores them in a queue. An instruction waits in the queue until its input operand values are available. Once all of an instruction's operand values are available the instruction is said to be ready for execution and may be issued to the out-of-order pipelines 112 for execution. An instruction's operand values may be available before the operand values of earlier, older instructions allowing the instruction to leave the queue before those earlier, older instructions. The out-of-order pipelines 112 may access one or more register files 116 to perform read and/or writes to the physical registers.

The load and store buffer 110 receives load and store instructions (e.g. instructions reading from or writing to a memory address) from the decode and renaming stage 104 and stores them in load and store buffers respectively. A load instruction waits in the load buffer until its source memory address has been resolved. Once a load instruction's source memory address has been resolved the instruction is said to be ready and may be issued to a data cache 118. The result of any load issued to the data cache 118 is returned to the load and store buffer 110 which in turn writes it to the appropriate register file 116. In the embodiments described herein the load and store buffer 110 is configured to speculatively issue a load instruction to the data cache 118 if all older unresolved store instructions are within a short window of the load instruction.

In some cases a store instruction may not be issued to the data cache 118 until its destination memory address has been resolved and it has been committed to the commit stage 114 by the re-order buffer 106. This is because before a store instruction is committed there is a chance it may be flushed due to the rewind of an older instruction. In particular, if a store instruction is issued to the data cache 118 before commit time and then subsequently flushed the update made to the data cache by the store instruction 118 cannot be undone. Furthermore, delaying the issue of store instructions until commit time does not cause a delay to load instructions that read from the same memory address since the data to satisfy the load instruction can be obtained from the store buffer. Loads on the other hand (as described above) can be issued as soon as they are ready because they do not update the data cache 118. Accordingly, there is no update that needs to be undone if they are rewound.

Figure 2:
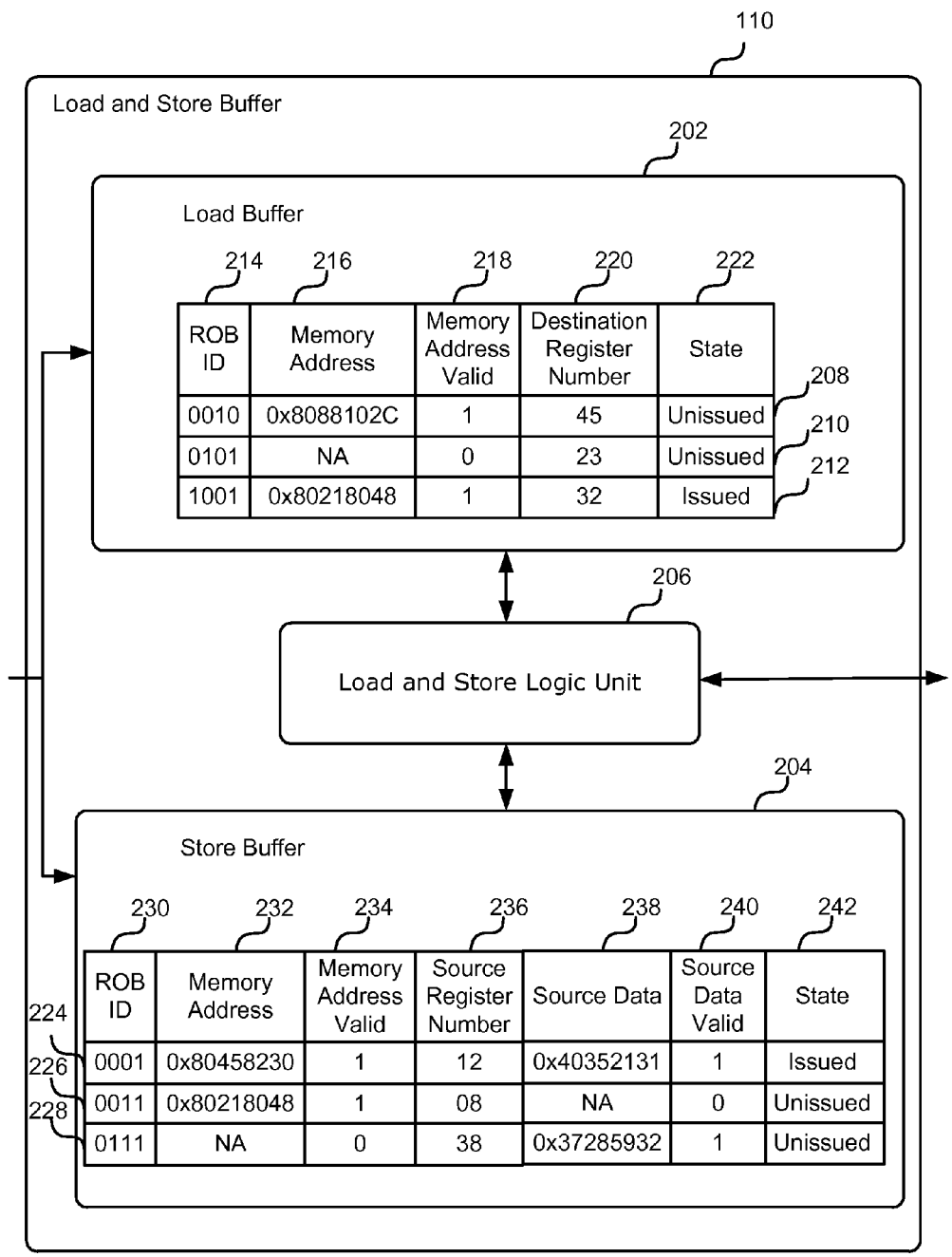
FIG. 2 is a schematic diagram of an example load and store buffer of FIG. 1.

An exemplary load and store buffer 110 is described in reference to FIG. 2.

The processor 100 may also comprises a branch predictor 120, which is configured to predict which direction the program flow will take in the case of instructions known to cause possible flow changes, such as a branch instructions. Branch prediction is useful as it enables instructions to be speculatively executed by the processor 100 before the outcome of the branch instruction is known. The branch predictor 120 can receive inputs from the fetch stage 102 and decode and renaming stage 104 relating to new instructions, and input from the out-of-order pipelines 112 and the load and store buffer 110 relating to executed instructions.

When the branch predictor 120 predicts the program flow accurately, this improves performance of the processor 100. However, if the branch predictor 120 does not correctly predict the branch direction, then a misprediction occurs which needs to be corrected before the program can continue. To correct a misprediction, the speculative instructions sent to the ROB 106 are abandoned, and the fetch stage 102 starts fetching instructions from the correct program branch.

Reference is now made to FIG. 2 which illustrates an example load and store buffer 110 of FIG. 1. As described above in reference to FIG. 1, the load and store buffer 110 is responsible for receiving load and store instructions from the decode and renaming stage 104 and storing them in respective load and store buffers until they are ready for issue. As described above, a load instruction may be ready for issue when its source memory address has been resolved, and a store instruction may be ready for issue when its destination memory address has been resolved and it has been committed by the commit stage 114. Once a load instruction is ready for issue, the load and store buffer 110 issues the load instruction to the data cache 118 (i) if there are no older unresolved store instructions in the store buffer; or (ii) if all of the older unresolved store instructions are within a short window of the load instruction; and the load instruction cannot be resolved by a store instruction in the store buffer (e.g. there are no older store instructions in the store buffer that write to the memory address specified in the load instruction). This short window will be referred to herein as the speculation window.

The load and store buffer 110 of FIG. 2 comprises a load buffer 202 for storing load instructions received from the decode and renaming stage 104, a store buffer 204 for storing store instructions received from the decode and renaming stage 104, and a load and store logic unit 206 for issuing loads and stores stored in the load and store buffers 202 and 204 to the data cache 118 once they are ready for issue. In some cases the load buffer 202, the store buffer 204, or both the load and store buffers 202 and 204 may be implemented as a circular buffer with a head and a tail.

The load buffer 202 receives load instructions from the decode and renaming stage 104 and stores them until they have been issued to the data cache 118 or they have been overwritten. The load buffer 202 may be configured as a table comprising a number of rows 208-212 and columns 214-222. For example, as shown in FIG. 2 the load buffer 202 may comprise a row 208-212 for each load instruction in the buffer and an ROB ID column 214, a memory address column 216, a memory address valid column 218, a destination register number column 220 and a state column 222. Although the example load buffer 202 of FIG. 2 comprises five columns 214-222, other embodiments may have more, fewer and/or different columns.

The ROB ID column 214 is used to store the ROB ID of the load instruction. Each entry/row in the ROB 106 is indexed with a ROB ID. Since each instruction is inserted into the ROB 106, each instruction is assigned a ROB ID which specifies the location or slot of the instruction in the ROB 106. Since instructions are stored in the ROB 106 in program order and thus the ROB IDs are assigned in program order, ROB IDs can be used to identify the order of instructions relative to other each other. The ROB ID of each load instruction is typically provided to the load and store buffer 110 by the decode and renaming stage 104 along with the load instruction.

The memory address column 216 is used to store the memory address read by the load instruction. The memory address is not typically provided to the load and store buffer 110 by the decode and renaming stage 104. Accordingly, when the load instruction is received from the decode and renaming stage 104 the memory address is said to be unresolved. The memory address is subsequently resolved and stored in the memory address column 216. In some cases the memory address may be resolved by the out-of-order pipelines 112. In other cases the memory address may be resolved by the load and store buffer 110. For example, the load and store buffer 110 may comprise an address generation unit (not shown) that generates or resolves memory addresses once the source registers are ready to be read.

The address generation unit may determine that a source register is ready to be read when it receives an indication from the out-of-order pipelines 112 that the register is ready to be read. In particular, the out-of-order pipelines 112 may be configured to send an indication that a particular physical register is ready to be read to the reservation station 108 and the load and store buffer 110 when it detects that an instruction writing to the particular physical register is being executed.

The memory address valid column 218 is used to indicate whether the data in the memory address column 216 is valid. The memory address valid column 218 may be implemented in any suitable manner. For example, in some cases the memory address valid column 218 may be implemented as a single bit, and in other cases the memory address valid column 218 may be implemented as a Boolean value. Since the memory address is not typically known at the time the row is created (e.g. at the time the load instruction is received from the decode and renaming stage 104) the memory address valid column 218 may initially be set (e.g. to "0" or "FALSE") to indicate that the data in the memory address column 216 is invalid. Once the memory address has been resolved and stored in the memory address column 216 the memory address valid column 218 may be updated (e.g. to "1" or "TRUE") to indicate that the data in the memory address column 216 is valid.

The destination register number column 220 is used to store the number of the physical register where the data obtained from the memory address identified in the memory address column 216 is to be stored.

The state column 222 may be used to indicate the current state of the load instruction. In some cases each instruction may be assigned one of the following states: issued and unissued. In these cases, when a load instruction is received from the decode and renaming stage 104, the state may be set to "unissued". Once issued to the data cache 118, the state may be changed to "issued".

The store buffer 204 receives store instructions from the decode and renaming stage 104 and stores them until they have been issued to the data cache 118 or overwritten. The store buffer 204, similar to the load buffer 202, may be configured as a table comprising a number of rows 224-228 and columns 230-242. For example, as shown in FIG. 2 the store buffer 204 may comprise a row 224-228 for each store instruction in the buffer and an ROB ID column 230, a memory address column 232, a memory address valid column 234, a source register number column 236, a source data column 238, a source data valid column 240, and a state column 242. Although the example store buffer 204 of FIG. 2 comprises seven columns, other embodiments may have more, fewer and/or different columns.

The ROB ID column 230 is used to store the ROB ID of the store instruction.

The memory address column 232 is used to store the memory address to be written to by the store instruction. The memory address is not typically provided to the load and store buffer 110 by the decode and renaming stage 104. Accordingly, when the store instruction is received from the decode and renaming stage 104 the memory address is said to be unresolved. The memory address is subsequently resolved and stored in the memory address column 232. In some cases the memory address may be resolved by the out-of-order pipelines 112. In other cases the memory address may be resolved by the load and store buffer 110. For example, the load and store buffer 110 may comprise an address generation unit (not shown) that generates or resolves memory addresses once the source registers are ready to be read.

The memory address valid column 234 is used to indicate whether the data in the memory address column 232 is valid. The memory address valid column 234 may be implemented in any suitable manner. For example, in some cases the memory address valid column 234 may be implemented as a single bit, and in other cases the memory address valid column 234 may be implemented as a Boolean value. Since the memory address is not typically known at the time the row is created (e.g. at the time the store instruction is received from the decode and renaming stage 104) the memory address valid column 234 may initially be set (e.g. to "0" or "FALSE") to indicate that the data in the memory address column 232 is invalid. Once the memory address has been resolved and stored in the memory address column 232 the memory address valid column 234 may be updated (e.g. to "1" or "TRUE") to indicate that the data in the memory address column 232 is valid.

The source register number column 236 comprises the number of the physical register containing the data to be written to the memory address identified in the memory address column 232.

The source data column 238 is used to store the data from the source register specified in the source register number column 236 that is to be written to the memory address specified in the memory address column 232. The source data is not typically provided to the load and store buffer 110 by the decode and renaming stage 104. Accordingly, when the store instruction is received from the decode and renaming stage 104 the source data is unknown. The load and store logic unit 206 may be configured to subsequently obtain the source data from the source register number specified in the source register number column 236 once it receives an indication from the out-of-order pipelines 112 that the source register is ready to be read. As described above in reference to FIG. 1, the out-of-order pipelines 112 may be configured to send an indication to the reservation station 108 and the load and store buffer 110 that a particular physical register is ready to be read when it detects that an instruction writing to the particular physical register is being executed.

The source data valid column 240 is used to indicate whether the data in the source data column 238 is valid. The source data valid column 240 may be implemented in any suitable manner. For example, in some cases the source data valid column 240 may be implemented as a single bit, and in other cases the source data valid column 240 may be implemented as a Boolean value. Since the source data is not typically known at the time the row is crated (e.g. at the time the store instruction is received from the decode and renaming stage 104) the source data valid column 240 may initially be set (e.g. to "0" or "False") to indicate that the data in the source data column 238 is invalid. Once the source data has been obtained and stored in the source data column 238 the source data valid column 240 may be updated (e.g. to "1" or "TRUE") to indicate that the data in the source data column 238 is valid.

In other examples, the store buffer 204 may not comprise source data and source data valid columns 238 and 240 as shown in FIG. 2. In these examples, the load and store logic unit 206 may be configured to obtain the source data from the register file 116 when the store instruction has been selected for issue to the data cache 118. This allows the store buffer 204 to be smaller than cases where the store buffer comprises source data and source data valid columns 238 and 240.

The state column 242 may be used to indicate the current state of the store instruction. In some cases each store instruction may be assigned one of the following states: issued and unissued. In these cases, when a store instruction is received from the decode and renaming stage 104, the state may be initially set to "unissued". Once issued to the data cache 118, the state may be changed to "issued".

The load and store logic unit 206 is responsible for issuing ready load and store instructions to the data cache 118. In some cases, only one load or store instruction can be issued to the data cache 118 in any cycle. In these cases, each clock cycle the load and store logic unit 206 reviews the load and store buffers 202 and 204 to determine if there are any ready loads and/or stores. As described above, a load instruction is deemed to be ready when its source memory address has been resolved, and a store instruction is deemed to be ready when its destination memory address has been resolved and it has been committed by the commit stage 114. Where there is both a ready load instruction and a ready store instruction the load and store logic unit 206 may use any suitable means for deciding whether to issue a load or a store. In general, load instructions will be given priority. However, in some cases the load and store logic unit 206 may be configured to give priority to the store instruction if certain conditions are met (e.g. the store buffer 204 is getting full.)

If it is decided that a load instruction is to be issued to the data cache 118 then the load and store logic unit 206 may (1) select one of the ready load instructions from the load buffer 202 to issue; and (2) determine whether the selected load instruction should be speculatively issued. In some cases, the load and store logic unit 206 may be configured to select the oldest ready load instruction from the load buffer 202.

A load instruction is said to be speculatively issued if there are any store instructions in the store buffer 204 that are older than the load instruction and have not been resolved (e.g. the destination memory addresses are unknown or unresolved). In some cases a load instruction is only speculatively issued to the data cache 118 if all older unresolved store instructions in the store buffer 204 are within the speculation window for the load instruction. This is based on the realization that programs are unlikely to comprise code that stores data to a memory address and shortly thereafter reads data from the same memory address.

In some cases the speculation window may cover a number of instructions immediately preceding the load instruction.

For example, the speculation window may be defined to cover the eight instructions immediately preceding the load instruction. In these cases determining whether all of the older unresolved store instructions in the store buffer 204 are within the speculation window may comprise: (i) defining the start of the speculation window as the ROB ID associated with the instruction immediately preceding the load instruction; (ii) defining the end of the speculation window as the ROB ID associated with the $X^{th}$ instruction immediately preceding the load instruction, where X is the size of the speculation window; and (iii) comparing the ROB IDs of the unresolved store instructions in the store buffer 204 to the start and end of the speculation window to determine if all of the older unresolved store instructions in the store buffer 204 are within the speculation window.

If all of the older unresolved store instructions in the store buffer 204 are within the speculation window then the load instruction may be speculatively issued to the data cache. If there is at least one older unresolved store instruction in the store buffer 204 that is outside the speculation window, the load instruction may be stalled. An example method for issuing load instructions in accordance with these principles is described in reference to FIG. 4.

In other cases the speculation window may cover a number of store instructions immediately preceding the load instruction. For example, the speculation window may be defined to cover the two store instructions immediately preceding the load instruction. In these cases determining whether all of the older unresolved store instructions in the store buffer 204 are within the speculation window may comprise: (i) using the ROB ID of the load instruction to identify the X store instructions in the store buffer 204 immediately preceding the load instruction, where X is the size of the speculation window; and (ii) determining whether there are any unresolved store instructions in the store buffer 204 that are older than the identified instructions.

If there are no unresolved store instructions in the store buffer 204 that are older than the identified store instructions then the load instruction may be speculatively issued to the data cache 118. If there is at least one unresolved store instruction in the store buffer 204 that is older than the identified store instructions, the load instruction may be stalled.

In some cases the speculation window size is fixed. In other case the speculation window size is dynamically adjusted. For example, the speculation window size may be adjusted based on the number of rewinds caused by speculatively issued load instructions and/or the number of unnecessary stalls of load instructions. An example method for dynamically adjusting the speculation window size is described in reference to FIG. 5.

The load buffer 202, the store buffer 204 and the load and store logic unit 206 may be implemented using any suitable hardware.

Figure 3:
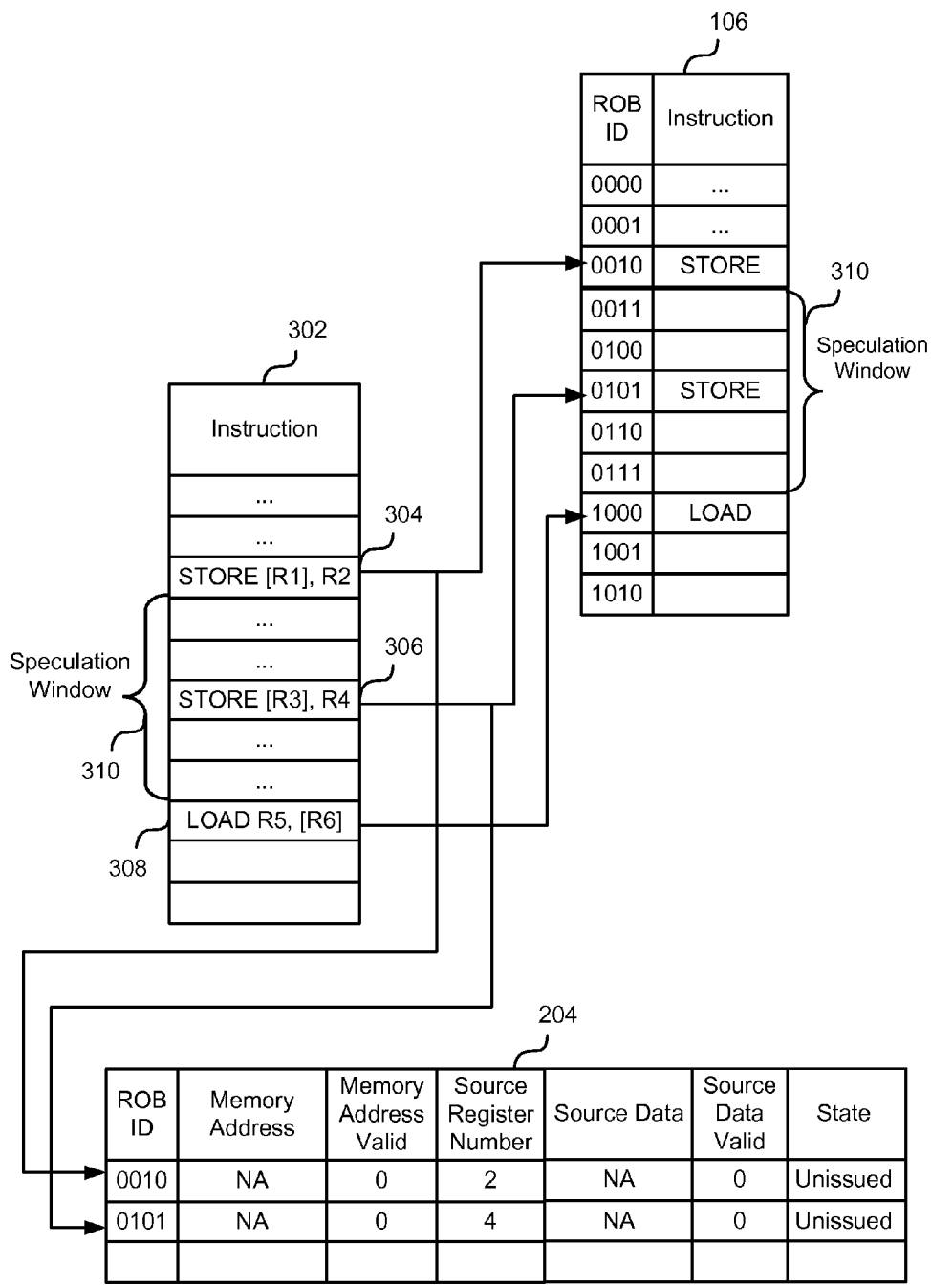
FIG. 3 is a schematic diagram illustrating the relationship between the program code, the re-order buffer and the store buffer of FIGS. 1 and 2.

Reference is now made to FIG. 3 which is a schematic diagram illustrating the relationship between the program code 302, ROB 106 and store buffer 204. The example program code 302 of FIG. 3 comprises two example store instructions 304 and 306 and one example load instruction 308. The first example store instruction 304 specifies that the data in register two is to be stored at the memory address specified by the data in register one. Similarly, the second example store instruction 306 specifies that the data in register four is to be stored at the memory address specified by the data in register three. The example load instruction 308 specifies that the data from the memory address specified by the data in register six is to be loaded into register five.

As described above in reference to FIG. 1, each instruction in the program is fetched by the fetch stage 102 in program order and provided to the decode and renaming stage 104. After performing decoding and renaming, the decode and renaming stage 104 provides each decoded and renamed instruction to the ROB 106 where it is stored in program order along with an ROB ID. In the example shown in FIG. 3 the first store instruction 304 is assigned ROB ID 0010, the second store instruction 306 is assigned ROB ID 0101 and the load instruction 308 is assigned ROB ID 1000.

The decode and renaming stage 104 also provides or dispatches any store and load instructions to the load and store buffer 110 for execution. The load and store buffer 110 stores any received load instructions in the load buffer 202 and any received store instructions in the store buffer 204. As described above in relation to FIG. 2 when the load/store instruction is received/dispatched from the decode and renaming stage 104 the corresponding memory address is typically not known and thus is said to be unresolved. The memory address is later resolved by the out-of-order pipelines 112 or the load and store buffer 110 and stored in the load or store buffer 202 or 204. In some cases a store instruction with an unresolved memory address may be identified by the memory address valid column 234 of the store buffer 204. In particular, when the memory address valid column 234 indicates that the data in the memory address column 232 is not valid the memory address for that store instruction is unresolved.

In the example shown in FIG. 3, both the first and second store instructions 304 and 306 have been stored in the store buffer 204, but they both have unresolved memory addresses (as indicated by the data in the memory address valid column).

Once the memory address of a load instruction has been resolved and stored in the load buffer 202 the load instruction is ready to be issued to the data cache 118. A store instruction, however, is not said to be ready for issue to the data cache 118 until the memory address of the store instruction had been resolved and stored in the store buffer 204 and the store instruction has been committed by the commit stage 114. As described above in reference to FIG. 2, once a load instruction is ready for issue the load and store logic unit 206 may determine if it should be issued based on the unresolved store instructions (e.g. store instructions with unresolved memory addresses) in the store buffer 204. In some cases, a ready load instruction may only be speculatively issued to the data cache if all older unresolved store instructions in the store buffer 204 are within a speculation window 310 of the load instruction.

As described in reference to FIG. 2, in some cases the speculation window 310 is defined as covering a certain number of instructions (X) immediately preceding the load instruction. In these cases the window may be defined as encompassing the X instructions immediately preceding the load instruction. The window may be determined based on the ROB ID of the load instruction and the number X. In the example, shown in FIG. 3, the ROB ID of the load instruction is 1000 and X is five, thus the speculation window 310 encompasses the instructions associated with ROB IDs 0011 to 0111.

Once the speculation window 310 is defined, determining if all of the unresolved store instructions in the store buffer 204 are within the speculation window may comprise comparing the ROB IDs of the older unresolved store instructions to the defined speculation window 310. If there are no older unresolved store instructions in the store buffer 204 then the load instruction may be issued to the data cache non-speculatively. If all older unresolved store instructions in the store buffer 204 are in the speculation window 310 then the load instruction may be issued to the data cache speculatively. If, however, there is at least one older unresolved store instruction in the store buffer 204 outside the speculation window 310 then the load instruction may be stalled until the older unresolved store instructions outside the speculation window 310 have been resolved.

In the example shown in FIG. 3, the load instruction 308 may be issued to the data cache non-speculatively if both the first and second store instructions 304 and 306 have been resolved; may be issued to the data cache speculatively if the first store instruction 304 has been resolved, but the second store instruction 306 has not (since the second store instruction 306 (ROB ID 0101) lies in the speculation window 0011 to 0111); and may be stalled if the first store instruction 304 has not been resolved regardless of the status of the second store instruction 306 (since the first store instruction 304 (ROB 010) lies outside the speculation window 0011 to 0111).

Figure 4:
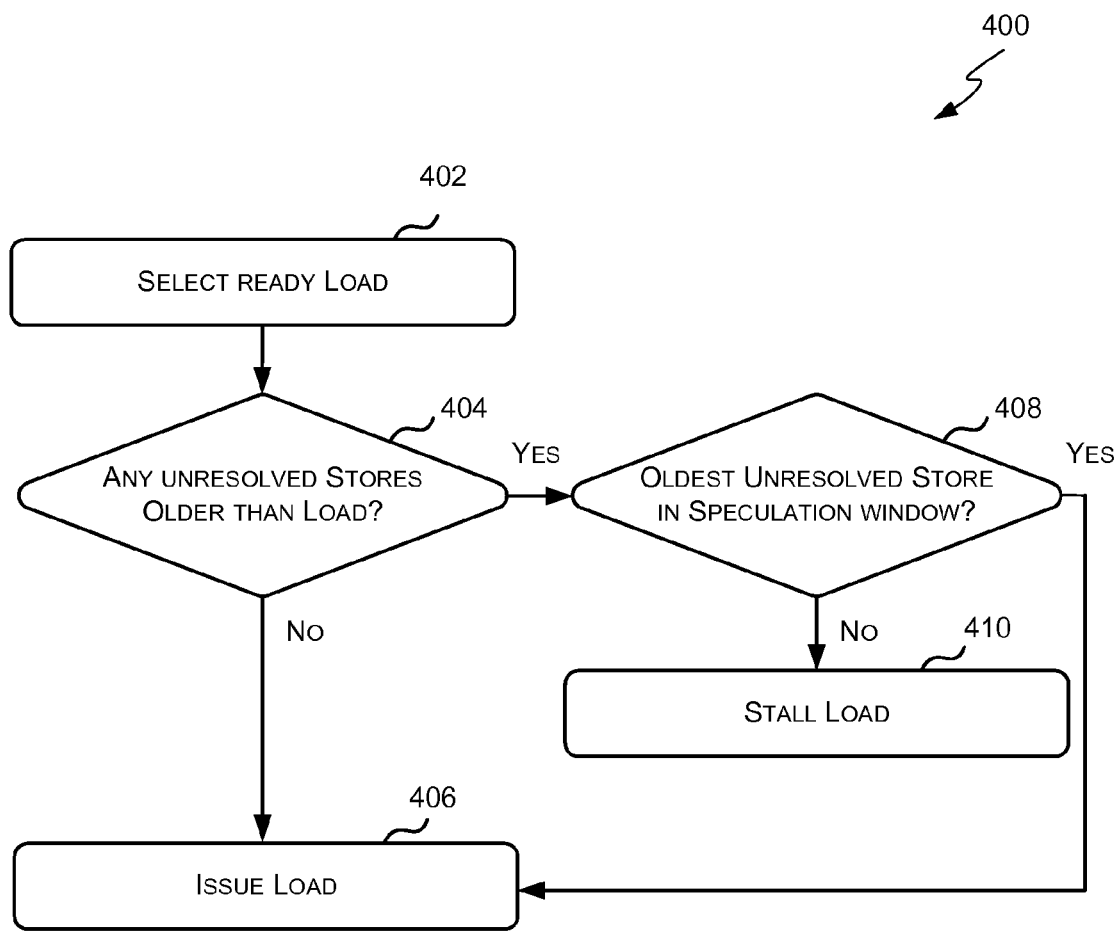
FIG. 4 is a flowchart of an example method for issuing a load instruction to a data cache.

Reference is now made to FIG. 4 which illustrates a method 400, which may be executed by the load and store logic unit 206 of FIG. 2, for issuing a load instruction to a data cache. At step 402, the load and store logic unit 206 selects a load instruction from the load buffer 202 that is ready to issue. A load instruction is said to be ready for issue when the memory address it is reading from has been resolved. As described above in reference to FIG. 2, in some cases the load and store logic unit 206 may select the oldest ready load instruction. In other cases the load and store logic unit 206 may use other criteria for selecting one of the ready load instructions. Once a load instruction has been selected, the method 400 proceeds to step 404.

At step 404, it is determined whether there are any unresolved store instructions in the store buffer 204 older than the load instruction selected in step 402. As described above, an unresolved store instruction is a store instruction for which the destination memory address has not been resolved. Determining whether a store instruction is an unresolved store instruction may comprise analyzing the memory address valid column of the store buffer 204. For example, a store instruction may be determined to be an unresolved store instruction if the memory address valid column indicates that the data in the memory address column is invalid.

Determining whether an unresolved store instruction is older than the load instruction may comprise comparing the ROB ID of the unresolved store instruction to the ROB ID of the load instruction.

If it is determined that there are no unresolved store instructions older than the selected load instruction in the store buffer 204 then the method 400 proceeds to step 406 where the load instruction is non-speculatively issued. If, however, it is determined that there is at least one unresolved store instruction that is older than the selected load instruction in the store buffer 204 then the method proceeds to step 408.

At step 406, the load instruction selected in step 402 is issued to the data cache 118. Once the load instruction has been issued, the method 400 ends.

At step 408, it is determined whether the oldest unresolved store instruction in the store buffer 204 is in a speculation window (e.g. window 310) for the load instruction. Any store instruction that is within the speculation window is unlikely to be writing to the same memory address as the load instruction, thus if the oldest unresolved store instruction in the store buffer 204 is within the speculation window the load instruction can be speculatively issued. Any store instruction that is older than the load instruction and outside the window has an increased chance of writing to the same memory address as the load instruction, thus if there is at least one older store instruction in the store buffer 204 outside the speculation window then the load instruction is stalled.

The size of the speculation window may be fixed or may be dynamically adjusted. For example, results show that a speculation window encompassing the previous eight instructions eliminates the majority of unnecessary stalls. Accordingly, in some cases the size of the speculation window may be fixed, for example, at eight instructions. An example method for dynamically adjusting the size of the speculation window is described in reference to FIG. 5.

In some cases, determining whether the oldest unresolved store instruction is within the speculation window may comprise: (i) identifying the start of the speculation window as the ROB ID associated with the instruction immediately preceding the load instruction (e.g. ROB ID of load instruction—1); (ii) identifying the end of the window as the ROB ID that is associated with the $X^{th}$ instruction immediately preceding the load instruction, where X is the size of the speculation window (e.g. ROB of load instruction—X); and (iii) comparing the ROB IDs of the store instructions in the store buffer 204 to the start and end of the speculation window to determine if they lie in the speculation window.

Since the ROB 106 may be implemented as a circular buffer the subtraction operations performed in steps (i) and (ii) may cause the ROB IDs to wrap around. For example, if the ROB ID of the load instruction is 0001, X is equal to four, and the last ROB ID is 1111 then the start of the speculation window may be ROB ID 0000 and the end of the speculation window may be ROB ID 1101. In another example, if the ROB ID of the load instruction is 0110, X is equal to five, and the last ROB ID is 1111 then the start of the speculation window may be ROB ID 0101 and the end of the speculation window may be ROB ID 0001. These examples are illustrated in Table 1.

TABLE 1

| ROB ID | Example 1 | Example 2 |
|---|---|---|
| 0000 | Start of Speculation Window | |
| 0001 | Load Instruction | End of Speculation Window |
| 0010 | | |
| 0011 | | |
| 0100 | | |
| 0101 | | Start of Speculation Window |
| 0110 | | Load Instruction |
| 0111 | | |
| 1000 | | |
| 1001 | | |
| 1010 | | |
| 1011 | | |
| 1100 | | |
| 1101 | End of Speculation Window | |
| 1110 | | |
| 1111 | | |

In other cases, determining whether the oldest unresolved store instruction is within the speculation window may comprise: (i) using the ROB ID of the load instruction to identify the X store instructions in the store buffer 204 immediately preceding the load instruction, where X is the size of the speculation window; and (ii) determining whether there are any unresolved store instructions in the store buffer 204 that are older than the identified instructions.

If it is determined that the oldest unresolved store instruction in the store buffer 204 is in the speculation window then the method proceeds to step 406 where the load instruction selected in step 402 is speculatively issued to the data cache. If, however, if it is determined that the oldest unresolved store instruction is outside the window then the method 400 proceeds to step 410 where the load instruction selected in step 402 is stalled. If a load instruction is stalled then it is not eligible to be issued until all of the store instructions outside the speculation window have been resolved.

In some cases, prior to issuing the load instruction to the data cache in step 406, the load and store logic unit 206 may be configured to first determine if the load instruction can be resolved by data in the store buffer 204. The load and store logic unit 206 may determine the load instruction can be resolved by the data in the store buffer 204 if there are any older resolved store instructions in the store buffer 204 that write to the memory address read by the load instruction. If there is at least one older resolved store instruction in the store buffer 204 that writes to the memory address read by the load instruction then the load and store logic unit 206 may be configured to use the source data of the youngest resolved store instruction instead of issuing the store instruction to the data cache 118. This data may then be subsequently provided to the register file 116 as per normal.

For example, referring to FIG. 2, the load instruction with ROB ID 1001 reads from memory address 0x80218048 and the store instruction with ROB 0011 writes to the same memory address. Accordingly, instead of issuing this load instruction to the data cache, the source data in the source data column 238 for store instruction 0011 may be used to satisfy the load instruction. Where, the source data is currently available (as indicated by the source data valid column) the data from the source data column 238 may be immediately provided to the register file 116. Where, however, the source data is unavailable (as indicated by the source data valid column), the load instruction may be stalled until the source data is available.

As noted above, it has been identified that a program is unlikely to comprise code that includes a store to a memory address quickly followed by a load of the same memory address. One of the exceptions to this is a function return. In particular, the code around a function return may store data in a memory address which is read (loaded) shortly thereafter. In particular, a function may have stored some data in a memory location which it wanted to return to the function caller. In this situation the function will write to a memory location and may then perform a function return which may be closely followed by the caller code reading the data back out of the same memory location.

Accordingly, in some embodiments, a load instruction may only be speculatively issued (e.g. issued before the memory addresses of older store instructions have been resolved) if there is not a function return in an instruction within a function window for the load instruction. This function return method may be used separately from or in conjunction with the speculation window method described above. For example, in some cases, prior to executing method 400 the load and store logic unit 206 may be configured to first determine if there is a function return in an instruction within a function window for the load instruction. The function window may be defined as a number of instructions preceding the load instruction where it is not acceptable to have a function return. The size of the function window may be fixed; dynamically determined (e.g. in a similar manner to that described in reference to FIG. 5 for dynamically adjusting the size of the speculation window); or (where used in conjunction with the speculation window method described above) a function of the size of the speculation window (e.g. 60% of the size of the speculation window, or four instructions smaller than the size of the speculation window). Where the size of the function window is a function of the size of the speculation window, and the size of the speculation window is dynamically determined, the size of the function window may be dynamically adjusted when the speculation window is adjusted.

In some cases the decode and renaming stage 104 may be configured to provide the load and store buffer 110 with the ROB ID of each function return that it detects. The load and store buffer 110 may then store these ROB IDs in a separate function return table. Then, instead of, or prior to, execution of method 400 the load and store logic unit 206 may be configured to determine if any of the function returns in the function return table are within the function window. If there is a function return within the function window then the load instruction is stalled until all older store instructions (i.e. store instructions that precede the load instruction in the program) have been resolved. If, however, there is no function return within the function window then the load instruction may be speculatively issued or method 400 may be executed to determine if the load is to be speculatively issued or stalled.

Similar logic may be implemented for other exceptions to the concept that a program is unlikely to comprise code that includes a store to a memory address quickly followed by a load to the same memory address.

Figure 5:
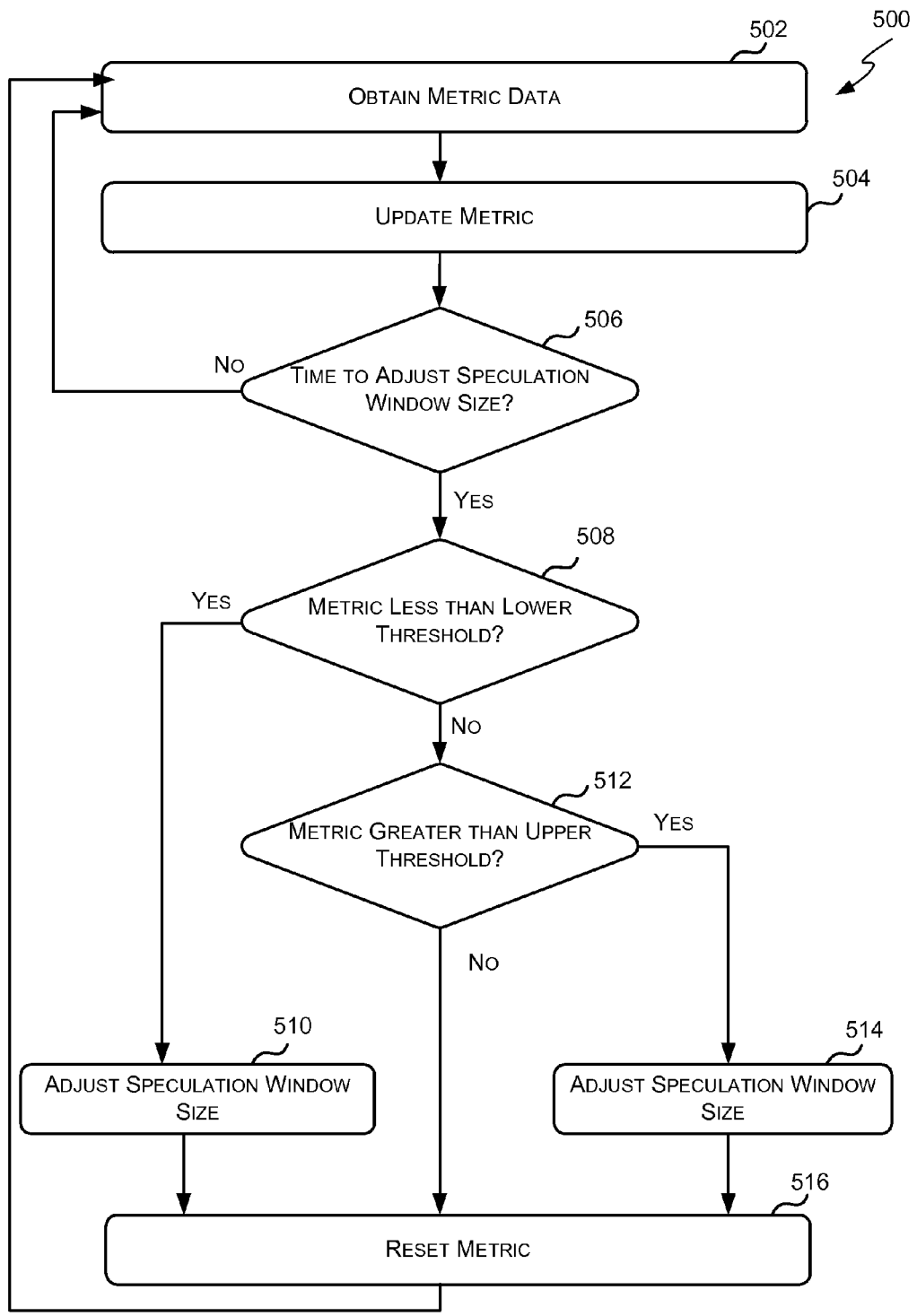
FIG. 5 is a flowchart of an example method for dynamically updating the size of the speculation window used in the method of FIG. 4.

Reference is now made to FIG. 5 which illustrates a method 500 for dynamically adjusting the size of the speculation window used in method 400. In some cases the size of the speculation window may be adjusted based on the number of rewinds; the number of unnecessary stalls; or both the number of rewinds and the number of unnecessary stalls.

At step 502 the load and store logic unit 206 obtains the metric data for the current clock cycle. In some cases the metric data is the number of rewinds related to speculatively executed load instructions that have occurred in the current clock cycle. For example, the load and store logic unit 206 may be configured to count and record the number of rewinds related to speculatively executed load instructions each clock cycle. In other cases the metric data may be the number of unnecessary load stalls that have occurred in the current clock cycle. For example, the load and store logic unit 206 may be configured to count and record the number of unnecessary load instruction stalls each clock cycle.

In yet other cases the load and store logic unit 206 may be configured to count both the number of rewinds and the number of stalls. In yet other cases the metric data may be a combination of the number of rewinds and the number of stalls in the current clock cycle. For example, the metric data (referred to as the combined metric data) may be calculated from formula (1) where A and B are weights based on the cost of a rewind and the cost of a stall respectively.

$$\text{metric data} = A * \text{num rewinds} - B * \text{num stalls} \quad (1)$$

Once the metric data has been obtained the method 500 proceeds to step 504.

At step 504, the metric data obtained in step 502 is used to update a resizing metric. In some cases the resizing metric may be a total count of the number of rewinds that have occurred due to speculatively issued load instructions. In these cases, updating the resizing metric may comprise adding the metric data obtained in step 502 to a rewind counter. In other cases the resizing metric may be a total count of the number of unnecessary load stalls. In these cases, updating the resizing metric may comprise adding the metric data to a stall counter. In yet other cases, the resizing metric (referred to as the first combined resizing metric) may be a total count of the combined metric data calculated in step 502. In these cases, updating the resizing metric may comprise adding the metric data to a combined metric counter.

In yet other cases, the load and store logic unit 206 may be configured to keep track of both the total number of rewinds and the total number of stalls. In some of these cases, one of the total number of rewinds and the total number of stalls may be the resizing metric and the other may be used in step 506 to determine when it is time to adjust the speculation window. In other of these cases, the resizing metric (referred to as the second combined resizing metric) may be based on the total number of rewinds and the total number of stalls. For example, the resizing metric may be calculated according to formula (2) where A and B are weights based on the cost of a rewind and the cost of a stall respectively.

$$\text{resizing metric} = A*\text{total num rewinds} - B*\text{total num stalls} \quad (2)$$

Once the resizing metric has been updated the method 500 proceeds to step 506.

At step 506 it is determined whether it is time to adjust the size of the speculation window. In some cases determining whether it is time to adjust the size of the speculation window comprises determining if a predetermined number of cycles have occurred since the last adjustment. In these cases the predetermined number of cycles is selected to be large enough to catch an unacceptable number of rewinds or unnecessary stalls. In some cases a useful predetermined number of cycles may be 100 or greater.

In other cases determining whether it is time to adjust the size of the speculation window may comprise determining if a predetermined number (e.g. eight) rewinds have occurred. In yet other cases determining whether it is time to adjust the size of the speculation window may comprise determining if a predetermined number of stalls have occurred.

If it is determined that it is time to adjust the size of the speculation window then the method 500 proceeds to step 508. If it is determined that it is not time to adjust the size of the speculation window then the method 500 proceeds back to step 502.

At step 508, it is determined whether the resizing metric (e.g. rewind counter; stall counter; first combined resizing metric; or second combined resizing metric) is below a low threshold. The low threshold may be hard coded or fixed, or it may be set by the program. For example, in some cases there may be a control register that the programmer may write the low threshold to via the program. In some cases the low threshold may be based on the predetermined number of cycles used in step 506. In some cases, the higher the predetermined number of cycles the higher the low threshold. For example, where the predetermined number of cycles is 1,000, the low threshold may be one rewind or stall. If the resizing metric is below the low threshold then the method 500 proceeds to step 510. If however, the resizing metric is above or equal to the low threshold then the method 500 proceeds to step 512.

At step 510, the speculation window size is adjusted. Where the resizing metric is the total number of rewinds then a low number of rewinds may indicate that the system is not speculative enough and so the speculation window size may be increased. Where the resizing metric is the total number of stalls then a low number of stalls may indicate that the system is too speculative and so the speculation window may be decreased. Where the resizing metric is one of the combined metrics (e.g. the first combined resizing metric or the second combined resizing metric) a positive number may indicate that the system is too speculative and a negative number may indicate that the system is not speculative enough. Accordingly, if the combined resizing metric is below the low threshold the speculation window may be increased.

In some cases the speculation window size is increased or decreased by a single instruction or single store instruction. In other cases, the speculation size may be increased or decreased by more than one instruction or more than one store instruction. Once the speculation window size has been adjusted, the method 500 proceeds to step 516.

At step 512, it is determined whether the resizing metric (e.g. rewind counter; stall counter; first combined resizing metric; or second combined resizing metric) is above a high/upper threshold. The high threshold may be hard coded or fixed, or it may be set by the program. For example, in some cases there may be a control register that the programmer may write the high threshold to via the program. In some cases, the high threshold may be based on the predetermined number of cycles used in step 506. Typically, the higher the predetermined number of cycles the higher the high threshold. For example, where the predetermined number of cycles is 1,000, the high threshold may be two rewinds or stalls. In some cases, the high and low thresholds may be the same. In other cases, the high and low thresholds may be different.

If the resizing metric is higher than the upper threshold then the method 500 proceeds to step 514. If however, the resizing metric is lower than or equal to the upper threshold then the method 500 proceeds to step 516.

At step 514, the speculation window size is adjusted. Where the resize metric is the total number of rewinds then a high number of rewinds may indicate that the system is too speculative and so the speculation window size may be decreased. Where the resize metric is the total number of stalls then a high number of stalls may indicate that the system is not speculative enough and so the speculation window may be increased. Where the resizing metric is one of the combined metrics (e.g. the first combined resizing metric or the second combined resizing metric) a positive number may indicate that the system is too speculative and a negative number may indicate that the system is not speculative enough. Accordingly, if the combined resizing metric is above the high threshold the speculation window may be decreased.

In some cases the speculation window size may be increased or decreased by a single instruction or store instruction. In other cases, the speculation window size may be increased or decreased by more than one instruction or store instruction. Once the speculation window size has been adjusted, the method proceeds to step 516.

At step 516 the resizing metric is reset (e.g. the total rewind counter, total stall counter, or first/second combined resizing metric is reset (i.e. zeroed)). Once the resizing metric has been reset, the method proceeds back to step 502.

While the examples described herein relate to single-threaded out-of-order processors, the methods and principles described herein may equally be applied to multi-threaded out-of-order processors.

Figure 6:
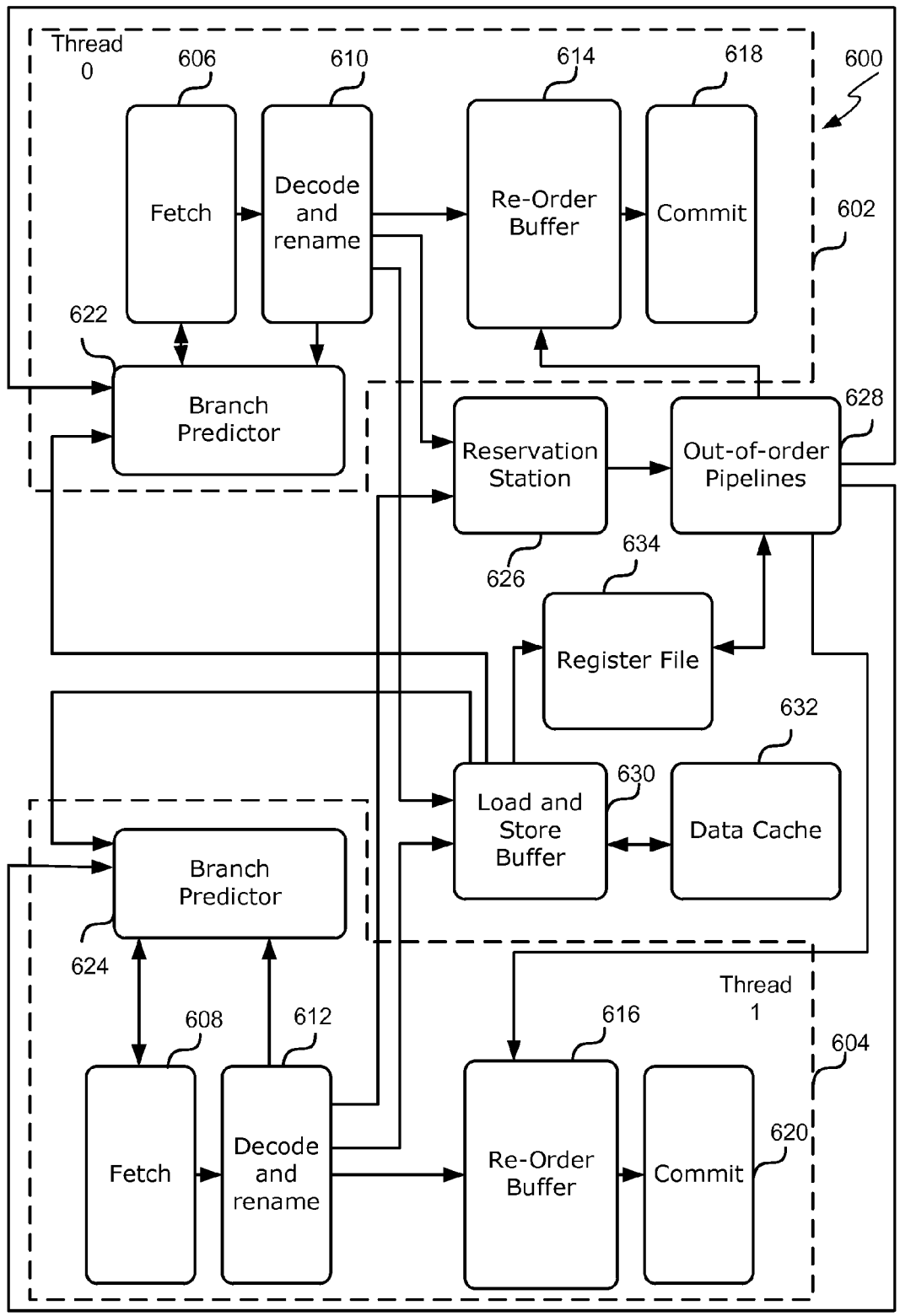
FIG. 6 is a schematic diagram of an example multi-threaded out-of-order processor.

Reference is now made to FIG. 6 which illustrates a schematic of a multi-threaded out-of order processor 600. The processor 600 comprises two threads 602 and 604 which will be referred to herein as thread 0 and thread 1 respectively. Each thread 602 and 604 comprises a fetch stage 606 or 608, a decode and renaming stage 610 or 612, a re-order buffer 614 or 616, a commit stage 618 or 620 and a branch predictor 622 or 624 as described above in reference to FIG. 1. The threads 602 and 604 share one or more reservation stations 626, out-of-order pipelines 628, a load and store buffer 630, a data cache 632, and one or more register files 634 as described above in reference to FIG. 1.

In cases where the threads 602 and 604 are operating in a unified memory space (i.e. there is no memory unit or the like that partitions or isolates memory space between the threads 602 and 604) then the load and store buffer 630 may be configured to consider store instructions from both threads 602 and 604 before issuing a load instruction. In cases, however, where there is isolation of memory regions of the different threads 602 and 604 then the load and store buffer 630 may be configured to consider only store instructions associated with the thread associated with the particular load instruction. For example, the load and store buffer 630 may be configured to only consider store instructions associated with thread 0 for a load instruction associated with thread 0.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to an item refers to one or more of those items. The term 'comprising' is used herein to mean including the method blocks or elements identified, but that such blocks or elements do not comprise an exclusive list and an apparatus may contain additional blocks or elements and a method may contain additional blocks or operations. Furthermore, the blocks, elements and operations are themselves not impliedly closed.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function (s). For example, such circuitry may include transistors and/ or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A method of issuing to a data cache a load instruction in a program, the method comprising:
    determining at a load and store logic unit whether there are any unresolved store instructions in a store buffer that are older than the load instruction;
    in response to determining that there is at least one unresolved store instruction in the store buffer older than the load instruction, determining at the load and store logic unit whether the oldest unresolved store instruction in the store buffer is within a speculation window for the load instruction, wherein the speculation window for any load instruction in the program covers a predetermined number of instructions immediately preceding that load instruction or a predetermined number of store instructions immediately preceding that load instruction; and
    in response to determining that the oldest unresolved store instruction is within the speculation window for the load instruction, speculatively issuing the load instruction to the data cache.

2. An apparatus with a load and store buffer arranged to issue to a data cache a load instruction in a program, the load and store buffer comprising:
    a store buffer for storing one or more store instructions; and
    a load and store logic unit in communication with the store buffer, the load and store logic unit configured to:
        determine whether there are any unresolved store instructions in the store buffer that are older than the load instruction,
        in response to determining that there is at least one unresolved store instruction in the store buffer older than the load instruction, determining whether the oldest unresolved store instruction in the store buffer is within a speculation window for the load instruction, wherein the speculation window for any load instruction in the program covers a predetermined number of instructions immediately preceding that load instruction or a predetermined number of store instructions immediately preceding that load instruction, and
        in response to determining that the oldest unresolved store instruction is within the speculation window for the load instruction, speculatively issuing the load instruction to the data cache.

3. The apparatus of claim 2, wherein each store instruction writes to a memory address and an unresolved store instruction is a store instruction where the memory address is unresolved.

4. The apparatus of claim 3, wherein the store buffer comprises memory address valid data for each store instruction in the store buffer, and the load and store logic unit determines whether there are any unresolved store instructions in the store buffer that are older than the load instruction by at least analyzing the memory address valid data in the store buffer.

5. The apparatus of claim 2, wherein the store buffer comprises an ID for each store instruction in the store buffer.

6. The apparatus of claim 5, wherein the load and store logic unit determines whether there are any unresolved store instructions in the store buffer that are older than the load instruction by at least comparing an ID associated with the load instruction with the IDs of the store instructions in the store buffer.

7. The apparatus of claim 5, wherein the load and store logic unit determines whether the oldest unresolved store instruction in the store buffer is within the speculation window for the load instruction by at least:
  identifying a start of the speculation window as an ID associated with the instruction in the program immediately preceding the load instruction;
  identifying an end of the speculation window as an ID associated with the Xth instruction in the program immediately preceding the load instruction, wherein X is the size of the speculation window; and
  comparing the IDs of the unresolved store instructions in the store buffer to the start and end of the speculation window to determine if the unresolved store instructions lie within the speculation window.

8. The apparatus of claim 5 wherein the IDs are re-order buffer IDs.

9. The apparatus of claim 2, wherein the load and store logic unit determines whether the oldest unresolved store instruction in the store buffer is within the speculation window for the load instruction by at least:
  identifying X store instructions in the store buffer immediately preceding the load instruction, wherein X is a size of the speculation window; and
  determining whether there are any unresolved store instructions in the store buffer that are older than the identified instructions.

10. The apparatus of claim 9, wherein the load and store logic unit identifies X store instructions in the store buffer immediately preceding the load instruction by at least comparing a re-order buffer ID associated with the load instruction to re-order buffer IDs associated with the store instructions in the store buffer.

11. The apparatus of claim 2, wherein the load and store logic unit is further configured to:
  determine whether the program comprises a function return instruction within a function window of the load instruction; and
  in response to determining that the program comprises a function return instruction within the function window of the load instruction, stalling the load instruction.

12. The apparatus of claim 2, wherein the size of the speculation window is fixed.

13. The apparatus of claim 2, wherein the load and store logic unit is further configured to dynamically adjust the size of the speculation window.

14. The apparatus of claim 13, wherein the load and store logic unit dynamically adjusts the size of the speculation window by at least:
  obtaining metric data at the load and store logic unit;
  updating a resizing metric based on the obtained metric data;
  periodically comparing the resizing metric to at least one of a lower threshold and an upper threshold;
  in response to determining that the resizing metric is less than the lower threshold, adjusting the size of the speculation window; and
  in response to determining that the resizing metric is greater than the upper threshold, adjusting the size of the speculation window.

15. The apparatus of claim 14, wherein the metric data is one of:
  a number of rewinds of speculatively executed load instructions that have occurred in a clock cycle and the resizing metric is a total count of the number of rewinds of speculatively executed load instructions; and
  a number of unnecessary stalls of load instructions that have occurred in a clock cycle and the resizing metric is a total count of the number of unnecessary stalls.

16. The apparatus of claim 14, wherein the resizing metric is compared to at least one of the lower threshold and the upper threshold after a predetermined number of cycles have elapsed since the last comparison.

17. The apparatus of claim 2, wherein the load and store logic unit is further configured to stall the load instruction if the oldest unresolved store instruction is outside the speculation window.

18. The apparatus of claim 2, wherein the load and store logic unit is further configured to non-speculatively issue the load instruction to the data cache if there are no unresolved store instructions in the store buffer older than the load instruction.

19. A non-transitory computer readable storage medium having encoded thereon computer readable program code for generating a processor comprising the apparatus of claim 2.

20. A non-transitory computer readable storage medium having encoded thereon computer readable program code for generating a processor configured to perform a method comprising:
  determining at a load and store logic unit whether there are any unresolved store instructions in a store buffer that are older than a load instruction to be issued to a data cache;
  in response to determining that there is at least one unresolved store instruction in the store buffer older than the load instruction, determining at the load and store logic unit whether the oldest unresolved store instruction in the store buffer is within a speculation window for the load instruction, the speculation window for any load instruction in the program covering a predetermined number of instructions immediately preceding that load instruction or a predetermined number of store instructions immediately preceding that load instruction; and
  in response to determining that the oldest unresolved store instruction is within the speculation window for the load instruction, speculatively issuing the load instruction to the data cache.

* * * * *